US010728724B2

(12) United States Patent
Chen et al.

(10) Patent No.: US 10,728,724 B2
(45) Date of Patent: Jul. 28, 2020

(54) COMMUNICATION DEVICE AND WIRELESS COMMUNICATION METHOD

(71) Applicant: FUJITSU LIMITED, Kawasaki-shi, Kanagawa (JP)

(72) Inventors: Hongyang Chen, Kawasaki (JP); Tsuyoshi Shimomura, Yokohama (JP); Yoshinori Tanaka, Yokohama (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 15/966,839

(22) Filed: Apr. 30, 2018

(65) Prior Publication Data

US 2018/0255563 A1 Sep. 6, 2018

Related U.S. Application Data

(63) Continuation of application No. PCT/JP2015/081222, filed on Nov. 5, 2015.

(51) Int. Cl.
*H04W 4/46* (2018.01)
*H04W 72/12* (2009.01)
(Continued)

(52) U.S. Cl.
CPC .............. *H04W 4/46* (2018.02); *H04W 4/70* (2018.02); *H04W 52/281* (2013.01);
(Continued)

(58) Field of Classification Search
None
See application file for complete search history.

(56) References Cited

U.S. PATENT DOCUMENTS 9,814,002 B2 * 11/2017 Park .................... H04W 52/243
10,200,512 B2 * 2/2019 Itagaki .................. H04L 1/0079
(Continued)

FOREIGN PATENT DOCUMENTS

CN 101729324 A 6/2010
JP 2004-185428 A 7/2004
(Continued)

OTHER PUBLICATIONS

LG Electronics Inc., "Support of Group Priorities," 3GPP TSG-RAN WG2 #89bis, R2-151628, Bratislava, Slovakia, May 20-24, 2015, 2pgs., XP_509365534A, 3rd Generation Partnership Project (Year: 2015).*

(Continued)

*Primary Examiner* — Ayaz R Sheikh
*Assistant Examiner* — Tarell A Hampton
(74) *Attorney, Agent, or Firm* — Myers Wolin, LLC

(57) ABSTRACT

A communication device supports a D2D (Device-to-Device) communication and includes a storage, a scheduler and a transmitter. The storage stores a first resource pool information that indicates first resource pool including control resources allocated to control information for transmitting data and a second resource pool information that indicates second resource pool including data resources allocated to data. The scheduler selects a first resource for transmitting control information from the first resource pool and selects a second resource for transmitting data from the second resource pool. The transmitter transmits the control information by using the first resource and transmit the data by using the second resource. The scheduler selects the second resource from the second resource pool according to a received signal intensity in at least one of resources included in the first resource pool and the second resource pool.

15 Claims, 13 Drawing Sheets

(51) Int. Cl.
  *H04W 4/70* (2018.01)
  *H04W 52/28* (2009.01)
  *H04W 72/02* (2009.01)
  *H04W 92/18* (2009.01)
  *H04W 52/38* (2009.01)
  *H04W 52/36* (2009.01)
  *H04W 88/02* (2009.01)

(52) U.S. Cl.
  CPC ........... *H04W 72/02* (2013.01); *H04W 72/12* (2013.01); *H04W 52/367* (2013.01); *H04W 52/383* (2013.01); *H04W 72/1231* (2013.01); *H04W 88/02* (2013.01); *H04W 92/18* (2013.01)

(56) References Cited

U.S. PATENT DOCUMENTS

| | | | |
|---|---|---|---|
| 10,251,161 B2* | 4/2019 | Kim | H04W 72/04 |
| 2004/0138809 A1 | 7/2004 | Mukaiyama | |
| 2009/0109949 A1 | 4/2009 | Wu et al. | |
| 2010/0312432 A1 | 12/2010 | Hamada et al. | |
| 2012/0287880 A1* | 11/2012 | Frederiksen | H04L 1/0065 370/329 |
| 2015/0004901 A1* | 1/2015 | Agiwal | H04W 76/14 455/39 |
| 2015/0009910 A1* | 1/2015 | Ryu | H04W 72/04 370/329 |
| 2015/0173048 A1* | 6/2015 | Seo | H04W 72/1247 370/329 |
| 2015/0215903 A1* | 7/2015 | Zhao | H04W 72/04 370/329 |
| 2015/0271807 A1* | 9/2015 | Patil | H04W 52/383 455/426.1 |
| 2015/0271818 A1* | 9/2015 | Tavildar | H04B 1/69 375/138 |
| 2015/0271840 A1* | 9/2015 | Tavildar | H04L 1/08 370/329 |
| 2015/0271861 A1* | 9/2015 | Li | H04W 56/001 455/426.1 |
| 2015/0327288 A1* | 11/2015 | Park | H04W 52/04 370/329 |
| 2015/0334698 A1* | 11/2015 | Park | H04W 4/70 455/426.1 |
| 2015/0358827 A1* | 12/2015 | Bendlin | H04W 72/0413 455/454 |
| 2015/0382324 A1* | 12/2015 | Sheng | H04W 72/02 370/329 |
| 2016/0037549 A1* | 2/2016 | Seo | H04W 76/14 370/329 |
| 2016/0037572 A1* | 2/2016 | Yeh | H04W 72/0406 370/329 |
| 2016/0044619 A1* | 2/2016 | Ryu | H04W 76/14 370/350 |
| 2016/0044652 A1* | 2/2016 | Xue | H04W 56/001 370/329 |
| 2016/0044665 A1* | 2/2016 | Novlan | H04W 76/14 370/336 |
| 2016/0044668 A1* | 2/2016 | Yoon | H04L 5/14 370/280 |
| 2016/0044694 A1* | 2/2016 | Park | H04W 72/10 370/329 |
| 2016/0066195 A1* | 3/2016 | Moon | H04W 16/14 455/454 |
| 2016/0080920 A1* | 3/2016 | Baghel | H04L 67/1044 455/404.1 |
| 2016/0081108 A1* | 3/2016 | Tseng | H04W 72/1242 370/329 |
| 2016/0112877 A1* | 4/2016 | Tseng | H04W 12/08 455/414.2 |
| 2016/0135239 A1* | 5/2016 | Khoryaev | H04W 76/14 370/329 |
| 2016/0157254 A1* | 6/2016 | Novlan | H04W 72/02 370/329 |
| 2016/0295624 A1* | 10/2016 | Novlan | H04W 76/14 |
| 2016/0302215 A1* | 10/2016 | Sorrentino | H04W 76/14 |
| 2016/0309481 A1* | 10/2016 | Verma | H04L 69/14 |
| 2016/0323869 A1* | 11/2016 | Xu | H04W 72/0473 |
| 2016/0337839 A1* | 11/2016 | Chae | H04W 76/14 |
| 2016/0353478 A1* | 12/2016 | Kim | H04W 72/12 |
| 2016/0374128 A1 | 12/2016 | Fukuta et al. | |
| 2017/0019813 A1* | 1/2017 | Kim | H04W 24/08 |
| 2017/0019910 A1* | 1/2017 | Seo | H04W 76/10 |
| 2017/0041971 A1* | 2/2017 | Kim | H04W 76/14 |
| 2017/0078898 A1* | 3/2017 | Huang | H04W 24/02 |
| 2017/0079084 A1* | 3/2017 | Matsumoto | H04W 76/14 |
| 2017/0126306 A1* | 5/2017 | Kim | H04W 76/14 |
| 2017/0164249 A1* | 6/2017 | Uemura | H04W 72/02 |
| 2017/0215027 A1* | 7/2017 | Yokomakura | H04W 8/00 |
| 2017/0215098 A1* | 7/2017 | Huang | H04W 76/14 |
| 2017/0215159 A1* | 7/2017 | Yokomakura | H04W 72/04 |
| 2017/0230938 A1* | 8/2017 | Huang | H04W 76/10 |
| 2017/0230939 A1* | 8/2017 | Rudolf | H04W 72/04 |
| 2017/0230956 A1* | 8/2017 | Kim | H04B 1/713 |
| 2017/0231024 A1* | 8/2017 | Matsumoto | H04W 8/24 |
| 2017/0238282 A1* | 8/2017 | Wei | H04W 72/042 370/329 |
| 2017/0245313 A1* | 8/2017 | Kim | H04W 76/14 |
| 2017/0285105 A1* | 10/2017 | Uemura | H04W 28/06 |
| 2017/0295554 A1* | 10/2017 | Lee | H04J 11/00 |
| 2017/0295567 A1* | 10/2017 | Chen | H04W 76/11 |
| 2017/0303214 A1* | 10/2017 | Lim | H04W 52/38 |
| 2017/0303215 A1* | 10/2017 | Kim | H04W 52/48 |
| 2017/0303240 A1* | 10/2017 | Basu Mallick | H04W 72/04 |
| 2017/0303277 A1* | 10/2017 | Wang | H04W 72/0446 |
| 2017/0303291 A1* | 10/2017 | Chae | H04W 72/04 |
| 2017/0318592 A1* | 11/2017 | Chu | H04W 24/02 |
| 2017/0325229 A1* | 11/2017 | Gao | H04W 76/14 |
| 2017/0339579 A1* | 11/2017 | Chu | H04W 24/02 |
| 2017/0339703 A1* | 11/2017 | Chu | H04W 24/02 |
| 2017/0347339 A1* | 11/2017 | Yasukawa | H04W 72/04 |
| 2017/0359835 A1* | 12/2017 | Seo | H04B 7/14 |
| 2018/0070371 A1* | 3/2018 | Shin | H04W 76/14 |
| 2018/0098369 A1* | 4/2018 | Yasukawa | H04W 48/10 |
| 2018/0132254 A1* | 5/2018 | Chae | H04W 72/02 |
| 2018/0139724 A1* | 5/2018 | Loehr | H04W 72/02 |
| 2018/0139769 A1* | 5/2018 | Lee | H04W 72/0453 |
| 2018/0176892 A1* | 6/2018 | Kim | H04W 72/0406 |
| 2018/0184348 A1* | 6/2018 | Uemura | H04W 4/70 |
| 2019/0089451 A1* | 3/2019 | Seo | H04B 7/15507 |
| 2019/0116586 A1* | 4/2019 | Basu Mallick | H04W 72/02 |

FOREIGN PATENT DOCUMENTS

| | | |
|---|---|---|
| JP | 2005-229478 A | 8/2005 |
| JP | 2009-147652 A | 7/2009 |
| JP | 2009-253731 A | 10/2009 |
| JP | 2011-502428 A | 1/2011 |
| JP | 2015-12405 A | 1/2015 |
| WO | 2009/058423 A1 | 5/2009 |
| WO | 2009107297 A1 | 9/2009 |
| WO | WO-2016047945 A1 * | 3/2016 ............ H04W 52/24 |

OTHER PUBLICATIONS

LG Electronics Inc., "Resource Pool Selection with Group Priorites," 3GPP TSG-RAN WG2 #88bis, R2-145078, San Francisco, USA, Nov. 17-21, 2014, 2pgs., XP50877195A, 3rd Generation Partnership Project (Year: 2014).*

Huawei et al., "Mode 2 resource allocation for D2D", Agenda Item: 7.2.3.2.1, 3GPP TSG-RAN WG1 Meeting #78, R1-142839, Dresden, Germany, Aug. 18-22, 2014.

Zte, "SA and Data Resource Selection for D2D Communication Mode 2", Agenda Item: 7.2.3.2.1, 3GPP TSG-RAN WG1 Meeting #78, R1-143138, Dresden, Germany, Aug. 18-22, 2014.

Qualcomm Incorporated, "V2V System Level Performance", Agenda Item: 7.2.8.2.1, 3GPP TSG-RAN WG1 Meeting #82bis, R1-155755, Malmo, Sweden, Oct. 5-9, 2015.

(56) References Cited

OTHER PUBLICATIONS

Interdigital Communications, "Priority handling for D2D Communication Mode 2", Agenda Item: 7.05.4, 3GPP TSG-RAN WG2 Meeting #91bis, R2-154775, Malmö, Sweden, Oct. 5-9, 2015.
Nokia Networks, "On support of different priorities and preemption", Agenda Item: 7.2.3.3, 3GPP TSG-RAN WG1 Meeting #82, R1-154481, Beijing, China, Aug. 24-28, 2015.
Huawei et al., "Multiplexing of SA and data", Agenda Item: 7.2.8.2.1, 3GPP TSG-RAN WG1 Meeting #82bis, R1-156101, Malmo, Sweden, Oct. 5-9, 2015.
Notification of Reasons for Refusal issued by the Japan Patent Office for corresponding Japanese Patent Application No. 2017-548581, dated Jan. 29, 2019, with an English translation.
International Search Report issued for corresponding International Patent Application No. PCT/JP2015/081222, dated Jan. 26, 2016.
Written Opinion of the International Searching Authority issued for corresponding International Patent Application No. PCT/JP2015/081222, dated Jan. 26, 2016, with an English translation.
Decision of Refusal issued by the Japan Patent Office for corresponding Japanese Patent Application No. 2017-548581, dated Jun. 4, 2019, with an English translation.
Reconsideration Report by Examiner before Appeal issued for corresponding Japanese Patent Application No. 2017-548581, dated Oct. 23, 2019, with full English translation attached.

\* cited by examiner

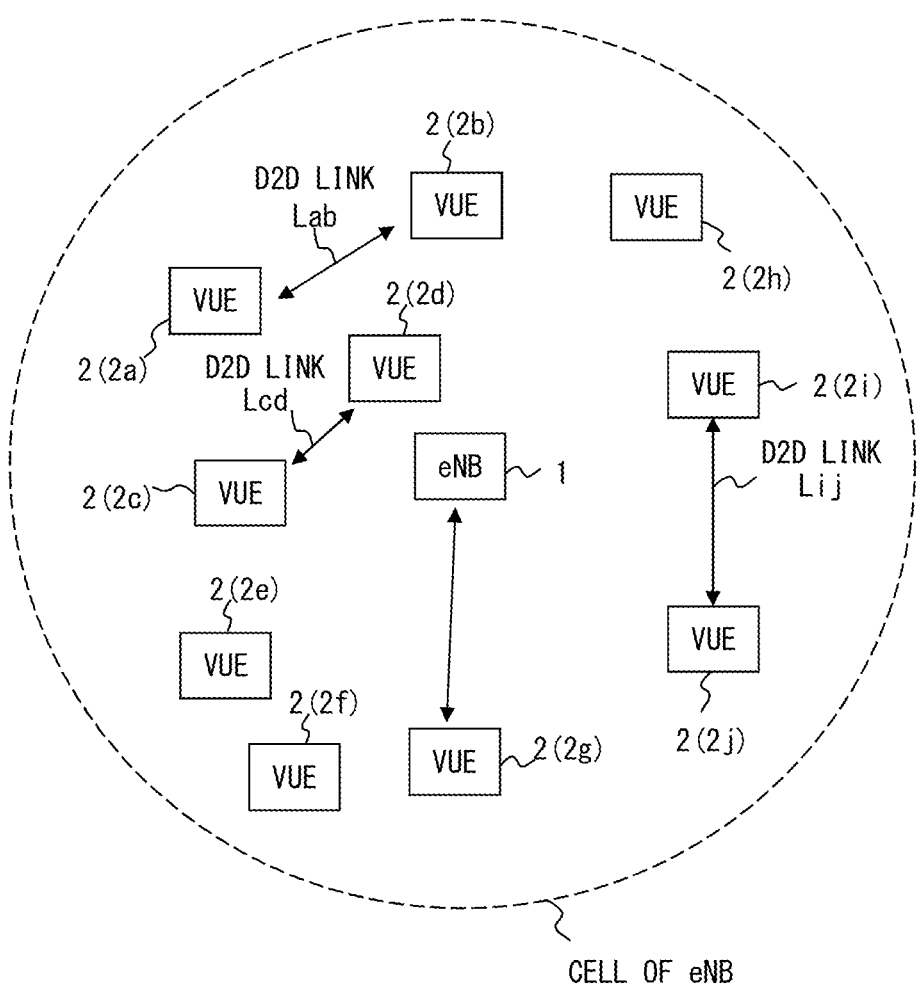
F I G. 2

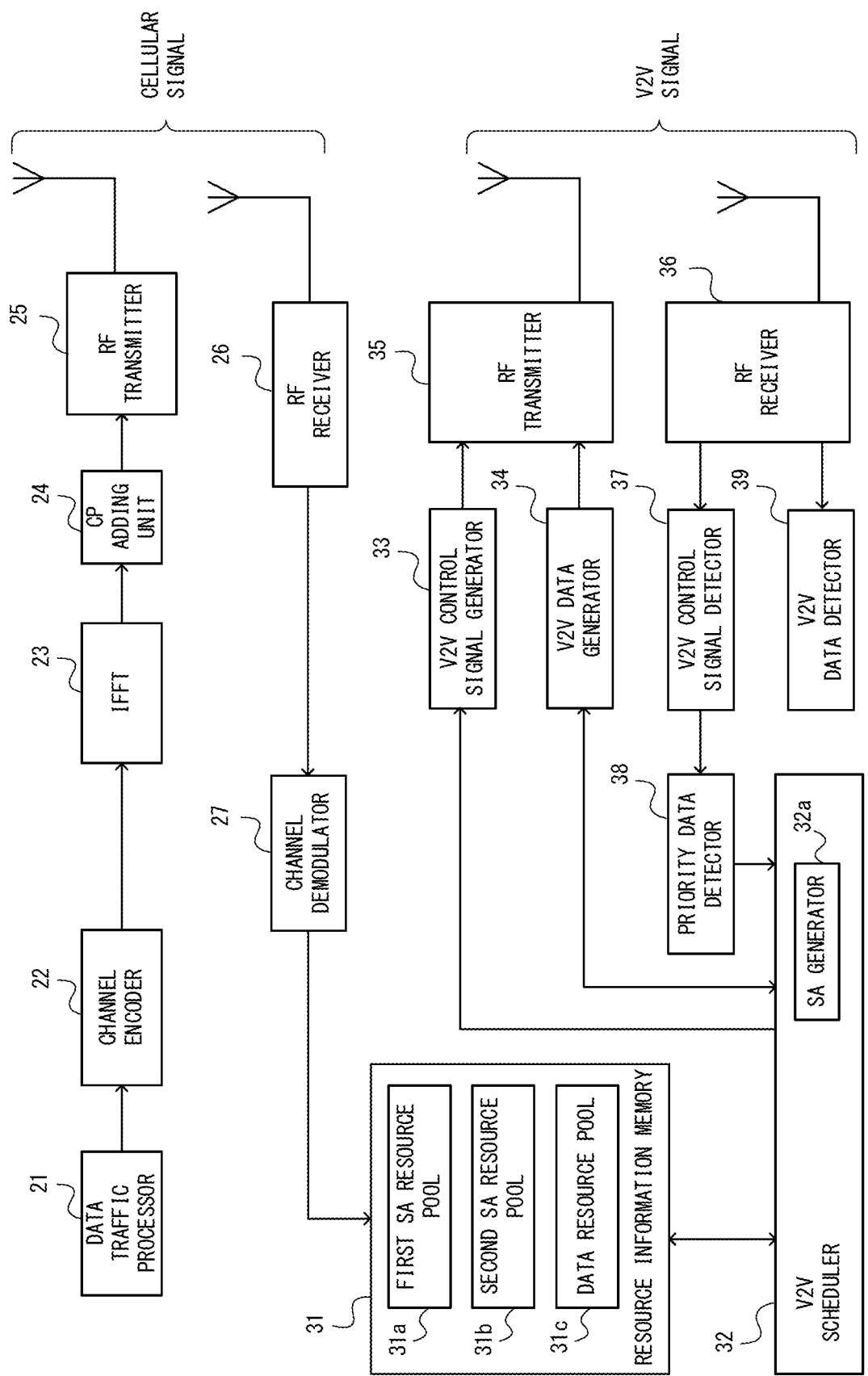
F I G. 4

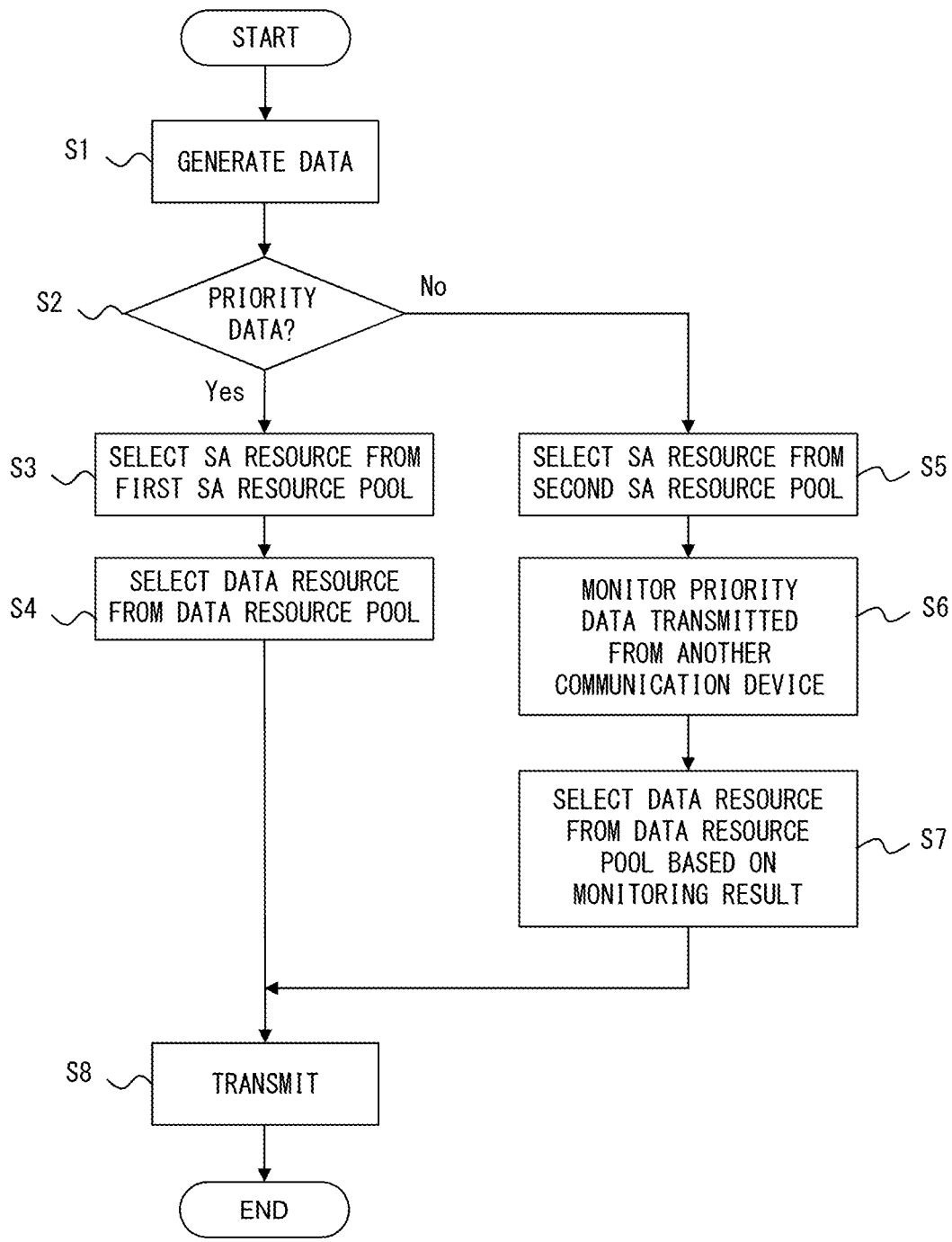
F I G. 7

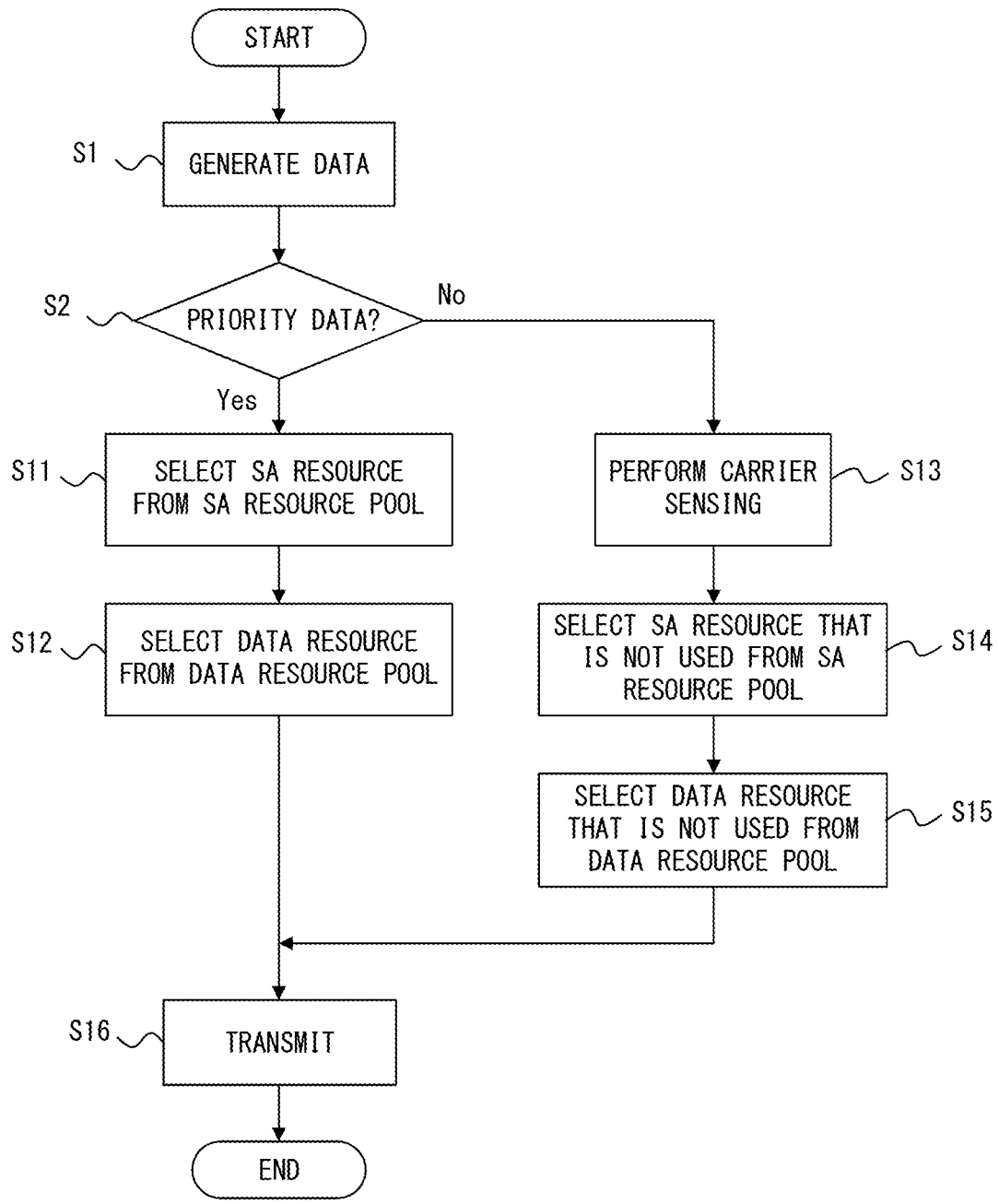
F I G. 13

COMMUNICATION DEVICE AND WIRELESS COMMUNICATION METHOD

CROSS-REFERENCE TO RELATED APPLICATION

This application is a continuation application of International Application PCT/JP2015/081222 filed on Nov. 5, 2015 and designated the U.S., the entire contents of which are incorporated herein by reference.

FIELD

The embodiments discussed herein are related to a communication device that performs D2D (Device-to-Device) communication and to a wireless communication method.

BACKGROUND

The Third Generation Partnership Project (3GPP) is considering the standardization of mobile communication schemes. The 3GPP has standardized for example high-speed wireless communication schemes such as LTE (Long Term Evolution) etc. Further, in 3GPP Release 12, the standardization of D2D communication is in progress as a new wireless communication scheme. D2D communication is one of the extended specifications of LTE, and is sometimes referred to as LTE Device to Device Proximity Services.

In D2D communication, a communication device can directly communicate with another communication device without going via a base station. Therefore, D2D communication is expected to realize communications with low latency. Also, D2D communication can be performed even in an area that radio waves of a base station do not reach (or an area not having a base station), and thus can contribute to the expansion of network coverage. Further, D2D communication can be performed even in a situation where it is not possible to use a base station (such as a case when a massive earthquake occurred for example), and thus can contribute to the improvement of the security of users. Note that a communication link established between communication devices for a D2D communication may also be referred to as a D2D link.

3GPP Release 13 includes a description related to Vehicle-to-Vehicle (V2V) services. V2V services may be implemented by utilizing for example D2D communications. In such a case, a V2V service is realized by a direct communication that is performed, without going via a base station, between a communication device implemented in a vehicle and a communication device implemented in another vehicle. Also, various applications are proposed for V2V services. For example, a vehicle having priority such as an ambulance etc. can make other vehicles traveling around that vehicle recognize the existence of that vehicle. Further, when a traveling vehicle stops urgently, it is possible to make other vehicles traveling around that vehicle recognize the urgent stop.

Communications using communication devices implemented in vehicles are disclosed by for example Japanese Laid-open Patent Publication No. 2004-185428, Japanese Laid-open Patent Publication No. 2005-229478, Japanese Laid-open Patent Publication No. 2009-147652, and Japanese Laid-open Patent Publication No. 2009-253731.

Scheduling for a D2D communication is performed by using an SA (Scheduling Assignment) message. Specifically, communication resources for a D2D communication are divided into SA areas and data areas. An SA area is used by a communication device to report an SA message to another communication device around the communication device. An SA message can indicate a communication resource (such as a time slot, a frequency, etc. for example) for transmitting data. Thereby, a communication device that receives an SA message can extract target data from a wireless signal.

The SA areas are inserted at prescribed time intervals. In the descriptions below, time intervals at which SA areas are inserted may also be referred to as "scheduling periods". The length of a scheduling period is 40 m seconds through 320 m seconds, although the length depends upon communication modes.

When transmitting data to a destination communication device, a communication device transmits an SA message to the destination communication device before transmitting that data. When for example transmission data is generated at time T1 illustrated in FIG. 1, the communication device uses the next SA area to transmit an SA message to the destination communication device, and thereafter transmits data to the destination communication device in accordance with the SA message. Accordingly, it is not possible for the communication device to transmit data in the period between T1 and T2 in the example illustrated in FIG. 1. In other words, latency depending upon a scheduling period may occur in D2D communication.

Meanwhile, there is a demand that latency be very low in a V2V service in some cases. For example, there is a demand that a pre-crash sensing warning be able to be transmitted with latency of 20 m seconds or shorter. However, it is sometimes difficult to meet this demand of latency in a case when a V2V service is provided by using an existing D2D communication.

A shorter scheduling period may solve this problem. However, it is sometimes not possible to transmit priority data (emergency data in particular) due to a conflict of the allocation of resources even with a shortened scheduling period. When for example a V2V service is provided by using a D2D communication, each communication terminal autonomously selects an arbitrary resource from a resource pool that is prepared in advance. This means that priority data transmitted from a communication device and non-priority data (i.e. normal data) transmitted from another communication device may sometimes collide in a case when a plurality of communication devices select the same resource for a V2V service. This leads to a possibility of failure of a communication of priority data.

Note that these problems arise not only in a V2V service but also in a wireless communication system that directly performs a communication between communication devices.

SUMMARY

According to an aspect of the present invention, a communication device that supports a D2D (Device-to-Device) communication includes: a storage configured to store a first resource pool information that indicates first resource pool including control resources allocated to control information for transmitting data and a second resource pool information that indicates second resource pool including data resources allocated to data; a scheduler configured to select a first resource for transmitting control information from the first resource pool and select a second resource for transmitting data from the second resource pool; and a transmitter configured to transmit the control information by using the first resource and transmit the data by using the second resource. The scheduler selects the second resource from the second resource pool according to a received signal intensity in at least one of resources included in the first resource pool and the second resource pool.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 illustrates an example of a wireless communication system according to an embodiment of the present invention;

FIG. 4 illustrates an example of a communication device according to a first embodiment;

FIG. 7 is a flowchart illustrating an example of a data transmission method according to the first embodiment;

FIG. 13 is a flowchart illustrating an example of a data transmission method according to the third embodiment.

DESCRIPTION OF EMBODIMENTS

Figure 1:
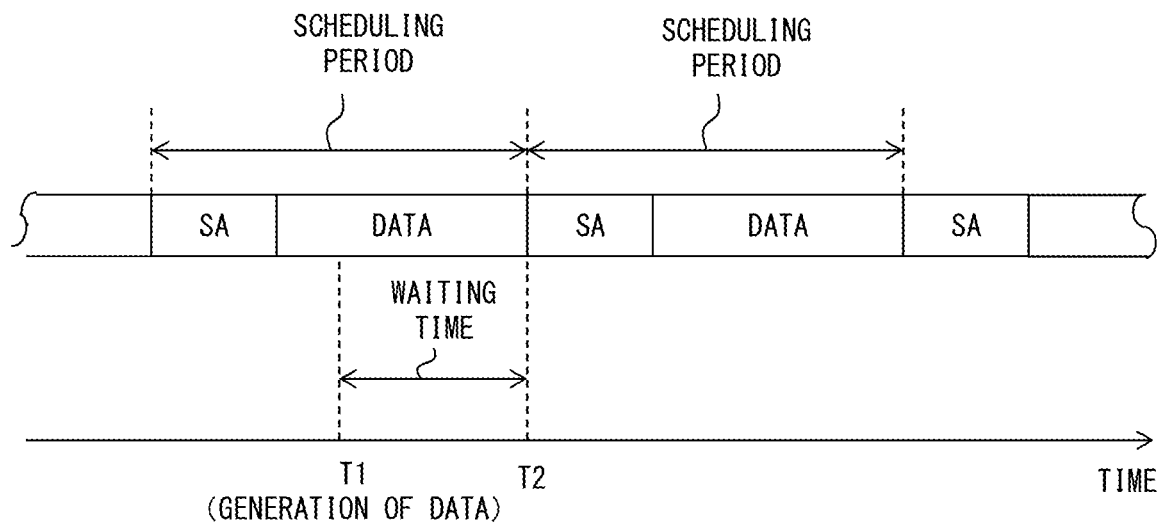
FIG. 1 explains a problem in the conventional techniques.

FIG. 2 illustrates an example of a wireless communication system according to an embodiment of the present invention. As illustrated in FIG. 2, a wireless communication system according to an embodiment of the present invention includes a base station 1 and a plurality of communication devices 2 (2a through 2j).

The base station 1 is an eNB (evolved Node B) in this example. An eNB is a base station used in LTE. Therefore, the base station 1 manages and controls cellular communications of LTE. In other words, the base station 1 can receive and process a data signal and a control signal of cellular communication transmitted from the communication devices 2. The base station 1 can also transmit a data signal and a control signal of cellular communication to the communication devices 2.

Further, the base station 1 can provide communication devices with resource information, which indicates a resource used by a D2D communication. Resource information includes for example time information, which indicates a time slot in which a D2D signal can be transmitted, and frequency information, which indicates a frequency at which a D2D signal can be transmitted.

The communication device 2 supports cellular communication and D2D communication. In other words, the communication device 2 can transmit and receive data to and from another communication device via the base station 1. The communication device 2 can also transmit and receive data directly to and from another communication device via a D2D link, i.e. without going via the base station 1. Note that data transmitted in the cellular communications or the D2D communications is not limited particularly, and includes audio data, image data, video data, text data, etc.

In the example illustrated in FIG. 2, D2D link Lab is established between the communication device 2a and the communication device 2b. D2d link Lcd is established between the communication device 2c and the communication device 2d. D2D link Lij is established between the communication device 2i and the communication device 2j. Note that the communication device 2g is communicating with another communication device via the base station 1.

In this example, the communication devices 2 are respectively implemented in vehicles. V2V services are realized by D2D communications between the communication devices 2. Accordingly, the communication device 2 may also be referred to as "V2V User Equipment (VUE)" in the descriptions below. In FIG. 2, VUEs 2a through 2j are depicted. Also, data for a V2V service that is transmitted in a D2D communication may also be referred to as "V2V data". Further, a D2D resource used for a V2V service may also be referred to as a "V2V resource".

In a wireless communication system having the above configuration, the communication device 2 can select a V2V resource for performing a V2V communication, in accordance with resource pool information provided from the base station 1. In this example, each communication device 2 autonomously selects a V2V resource. Thus a plurality of D2D links may use the same resource at the same time. When a plurality of D2D links that use the same resource are close to each other, a "conflict between resources" causes interference between the D2D links. Thus, the communication device 2 has a function of suppressing or avoiding a conflict between resources.

The communication device 2 can transmit V2V data having different levels of priority. In the descriptions below, data having a high level of priority may also be referred to as "priority data" or "emergency data" in some cases. Also, data having a level of priority that is lower than that of priority data may also be referred to as "non-priority data" or "normal data" in some cases. In this example, there is a demand that priority data/emergency data be transmitted to another communication device with low latency. For example, when failure occurs in a vehicle while it is traveling, it is desirable that the failure be reported to other vehicles instantaneously. Therefore, data for reporting failure of a vehicle is an example of priority data/emergency data.

The communication device 2 can select a resource in a different method depending upon whether it transmits priority data/emergency data or non-priority data/normal data. For example, when transmitting priority data/emergency data, the communication device 2 may select a resource in such a manner that the priority data/emergency data is transmitted with low latency.

Figure 3:
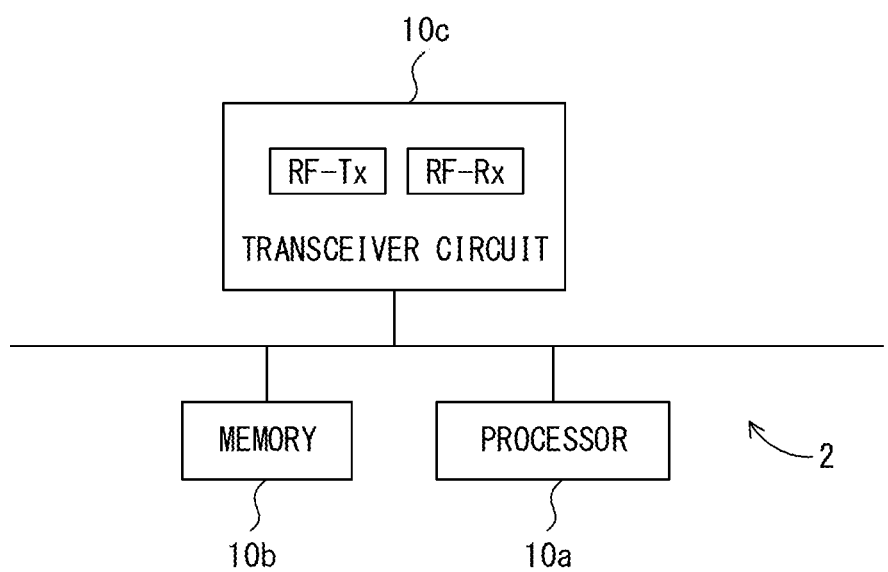
FIG. 3 illustrates an example of a hardware configuration of a communication device.

FIG. 3 illustrates an example of a hardware configuration of the communication device 2. As illustrated in FIG. 3, the communication device 2 includes a processor 10a, a memory 10b and a transceiver circuit 10c. Also, the communication device 2 may include an additional hardware element.

The processor 10a executes a given program so as to provide the function of the communication device 2. The memory 10b stores a program that is executed by the processor 10a. Also, the memory 10b stores resource information, which will be described later. Note that the memory 10b includes a work area for the processor 10a. The transceiver circuit 10c includes a circuit (RF-Tx) that transmits a wireless signal and a circuit (RF-Rx) that receives a wireless signal.

First Embodiment

FIG. 4 illustrates an example of a communication device according to a first embodiment of the present invention. As illustrated in FIG. 4, the communication device 2 according to the first embodiment includes, for supporting a cellular communication, a data traffic processor 21, a channel encoder 22, an IFFT circuit 23, a CP adding unit 24, an RF transmitter 25, an RF receiver 26 and a channel demodulator 27.

The data traffic processor 21 generates traffic that is transmitted in a cellular communication. The channel encoder 22 encodes traffic that is output from the data traffic processor 21. The IFFT circuit 23 conducts an inverse fast Fourier transform on a signal output from the channel encoder 22, and generates a time domain signal. The CP adding unit 24 adds a cyclic prefix (CP) to a time domain output from the IFFT circuit 23. The RF transmitter 25 transmits a cellular signal via an antenna. The cellular signal is received by a base station (such as the eNB1 illustrated in FIG. 2 for example).

The RF receiver 26 receives a cellular signal transmitted from the base station. The channel demodulator 27 demodulates the received cellular signal. Note that when a cellular signal received from the base station includes resource information, which will be described later, the channel demodulator 27 demodulates the received cellular signal to recover the resource information. Then, the channel demodulator 27 stores that resource information in a resource information memory 31.

As illustrated in FIG. 4, the communication device 2 includes, for supporting a D2D communication, the resource information memory 31, a V2V scheduler 32, a V2V control signal generator 33, a V2V data generator 34, an RF transmitter 35, an RF receiver 36, a V2V control signal detector 37, a priority data detector 38 and a V2V data detector 39.

The resource information memory 31 stores resource information received from the base station. Resource information indicates a resource that is used for a V2V service. In this example, resource information includes a first SA resource pool 31a, a second SA resource pool 31b and a data resource pool 31c. The first SA resource pool 31a indicates a plurality of resource elements for transmitting the SA information of priority data in a V2V service. SA information is part of control information for transmitting V2V data, and indicates a resource that is used for transmitting V2V data. The second SA resource pool 31b indicates a plurality of resource elements for transmitting the SA information of non-priority data in a V2V service. The data resource pool 31c indicates a plurality of resource elements for transmitting data (including priority data and non-priority data) in a V2V service. In this example, each resource element is implemented by for example a combination of a time slot and a subcarrier frequency.

The V2V scheduler 32 determines a transmission schedule based on resource information stored in the resource information memory 31 when a communication device 2 transmits V2V data (priority data or non-priority data). Specifically, when a communication device 2 transmits priority data, the V2V scheduler 32 selects from the first SA resource pool 31a an SA resource element for transmitting the control information of the priority data, and also selects from the data resource pool 31c a data resource element for transmitting the data. When a communication device 2 transmits non-priority data, the V2V scheduler 32 selects from the second SA resource pool 31b an SA resource element for transmitting the control information of the non-priority data, and also selects from the data resource pool 31c a data resource element for transmitting the data.

The V2V scheduler 32 includes an SA generator 32a that generates SA information for a V2V communication. In the present example, SA information includes the following elements.

(1) Time slot in which V2V data is to be transmitted
(2) Frequency at which V2V data is to be transmitted Note that the SA generator 32a may be included in the V2V scheduler 32 or may be provided outside the V2V scheduler 32.

The V2V control signal generator 33 generates a V2V control signal that represents control information of a V2V communication. Control information for a V2V communication may include the following pieces of information in addition to SA information generated by the SA generator 32a.

(1) Data type (priority/non-priority) of V2V data
(2) Transmission power of V2V signal
(3) The number of iterations of iterative transmission
(4) MCS (Modulation and Coding Scheme)

The V2V data generator 34 generates V2V data transmitted by the communication device 2. For example, a sensor related to the traveling of the vehicle is connected to the V2V data generator 34. In such a case, when this sensor detects an abnormal state, the V2V data generator 34 generates corresponding V2V data. The V2V data generator 34 may also determine the data type (priority/non-priority) of generated V2V data in accordance with the type of the abnormal state detected by the sensor. The data type of V2V data is reported to the V2V scheduler 32. Then, in accordance with the data type of the generated V2V data, the V2V scheduler 32 determines a transmission schedule of that V2V data. In accordance with the transmission schedule determined by the V2V scheduler 32, the RF transmitter 35 transmits a V2V signal (including a V2V control signal and a V2V data signal) via an antenna.

The RF receiver 36 receives a V2V signal (including a V2V control signal and a V2V data signal) transmitted from another communication device. The V2V control signal detector 37 demodulates and decodes the received V2V control signal, and recovers the control information. Based on the SA information included in the control information recovered by the V2V control signal detector 37, the priority data detector 38 detects the schedule (time slot and frequency) of priority data transmitted from another communication device. Note that when priority data is transmitted from another communication device, the V2V scheduler 32 may determine a transmission schedule of non-priority data that is to be transmitted by a communication device 2, in such a manner that the non-priority data transmitted by the communication device 2 and the priority data transmitted from the other communication device will not collide. The V2V data detector 39 demodulates and decodes the received V2V data, and recovers the data transmitted from another communication device.

Note that the data traffic processor 21, the channel encoder 22, the IFFT circuit 23, the CP adding unit 24, the channel demodulator 27, the V2V scheduler 32, the V2V control signal generator 33, the V2V data generator 34, the V2V control signal detector 37, the priority data detector 38 and the V2V data detector 39 may be implemented by the processor executing a given program. However, some of these functions may be realized by a hardware circuit. The RF transmitters 25 and 35 and the RF receivers 26 and 36 may be implemented by the transceiver circuit 10c illustrated in FIG. 3. Further, the resource information memory 31 may be implemented by the memory 10b illustrated in FIG. 3.

Figure 5:
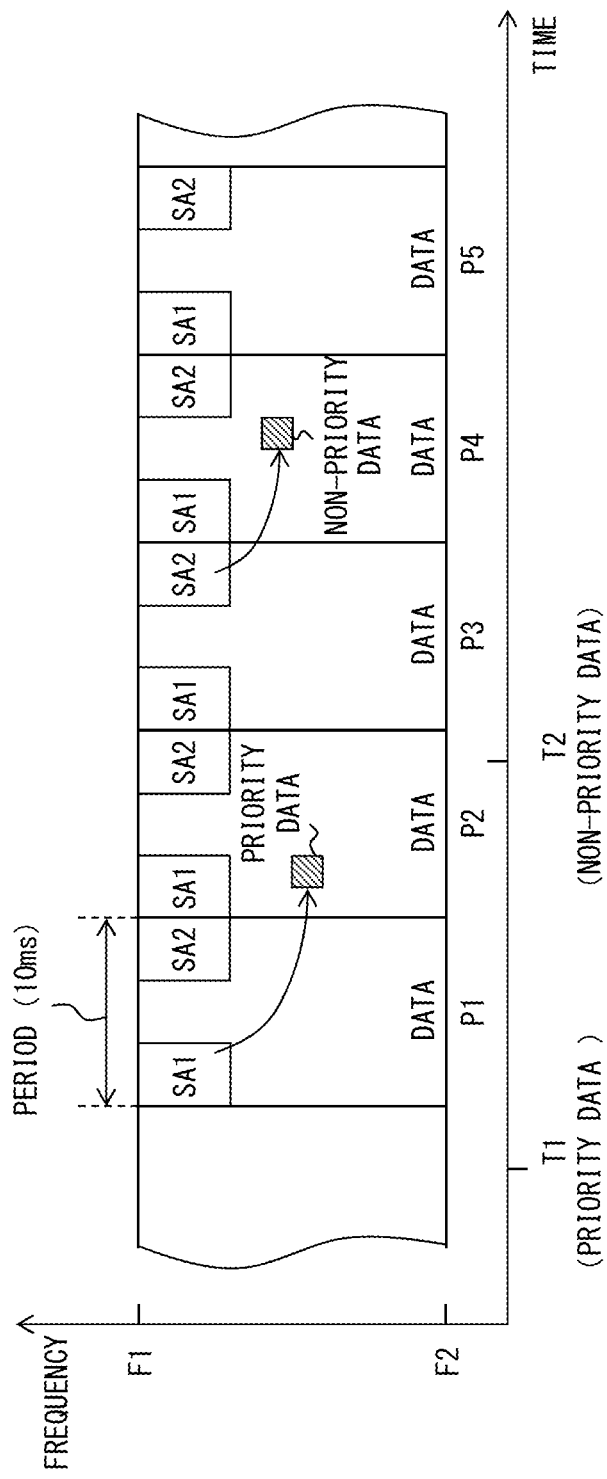
FIG. 5 schematically illustrates an example of scheduling for a V2V communication.

FIG. 5 schematically illustrates an example of scheduling for a V2V communication. For the sake of simplicity of the explanations, it is assumed in this example that the frequency band between F1 and F2 is allocated to a V2V communication. Note that the frequency band between F1 and F2 may be in an unlicensed band.

V2V communications use resources that are periodically allocated to the V2V communications. In this example, the period of a V2V communication is 10 m seconds. In other words, one period of a V2V communication is realized by 10 subframes of a D2D communication. In the example illustrated in FIG. 5, periods P1 through P5 are depicted. While FIG. 5 illustrates an example in which SA information is multiplexed with data by frequency division multiplexing (FDM), the SA information may be multiplexed with data by time division multiplexing and frequency division multiplexing.

Figure 6:
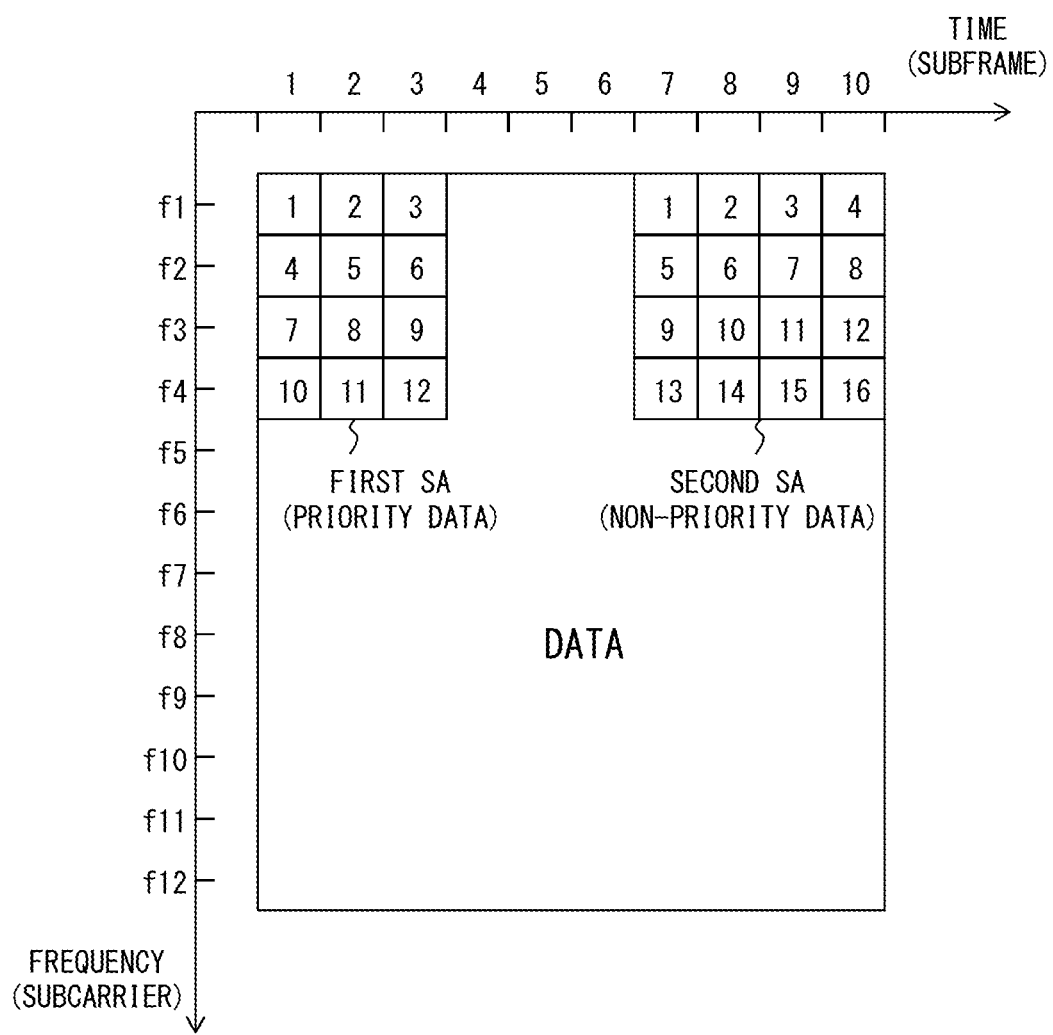
FIG. 6 illustrates an example of a resource pool of a V2V communication.

FIG. 6 illustrates an example of a resource pool of a V2V communication. A resource of a V2V communication is defined by time and a frequency in this example. Time resources are expressed by time slots in a V2V period. In this example, one V2V period includes 10 time slots. In other words, one subframe is allocated to one time slot. Frequency resources are expressed by a plurality of subcarriers provided in the frequency band (between F1 and F2 in FIG. 5) allocated to a V2V communication. In this example, 12 subcarriers are provided in a frequency band of a V2V communication. The frequencies of the 12 subcarriers are expressed by f1 through f12.

In the first embodiment, a resource for transmitting the control information of priority data and a resource for transmitting the control information of non-priority data are prepared separately from each other. In other words, different resources are used for transmitting the control information of priority data and transmitting the control information of non-priority data. In the example illustrated in FIG. 6, the first SA resource for transmitting the control information of priority data is allocated in time slots 1 through 3 of frequencies f1 through f3. In other words, the first SA resource includes 12 SA resource elements. Meanwhile, the second SA resource for transmitting the control information of non-priority data is allocated in time slots 7 through 10 of frequencies f1 through f3. In other words, the second SA resource includes 16 SA resource elements. Note that other frequency-time elements are used as data resources for transmitting V2V data. The data resources are shared by priority data and non-priority data.

Note that resource information, which indicates the resource pool of a V2V communication, is generated by a base station and is reported to each communication device (VUE). Then, the resource information is stored in the resource information memory 31 in each communication device. Note that the first SA resource and the second SA resource illustrated in FIG. 6 respectively correspond to the first SA resource pool 31a and the second SA resource pool 31b illustrated in FIG. 4. Also, the data resources illustrated in FIG. 6 corresponds to the data resource pool 31c illustrated in FIG. 4.

FIG. 4 and FIG. 5 will be explained again. When a communication device 2 transmits V2V data, the V2V scheduler 32 determines a resource for the V2V communication as described above. In this determination, the V2V scheduler 32 determines the resource by applying a different rule depending upon whether the V2V data is priority data or non-priority data.

When priority data is generated by the V2V data generator 34 at time T1, the V2V scheduler 32 selects a resource for transmitting the control information of that priority data from the first SA resource pool 31a. In other words, the V2V scheduler 32 randomly selects one SA resource element from among the 12 SA resource elements in the first SA resource illustrated in FIG. 6. The V2V scheduler 32 also selects a resource for transmitting that priority data from the data resource pool 31c. In other words, the V2V scheduler 32 randomly selects one data resource element from among data resource elements in the data resources illustrated in FIG. 6.

Then the communication device 2 transmits the control information of the priority data by using the selected SA resource element and transmits the priority data by using the selected data resource element. For this transmission, the communication device 2 transmits the control information in the first V2V period after the priority data is generated, and transmits the generated priority data in the next V2V period. Specifically, the control information is transmitted in V2V period P1 and the priority data is transmitted in V2V period P2.

The control information of priority data includes SA information that indicates a resource used for transmitting that priority data. The SA information specifies the subcarrier frequency and the time slot used for transmitting the priority data. In other words, the SA information specifies a resource element selected from the data resource pool 31c for transmitting the priority data.

When non-priority data is generated by the V2V data generator 34 at time T2, the V2V scheduler 32 selects a resource for transmitting the control information of that non-priority data from the second SA resource pool 31b. In other words, the V2V scheduler 32 randomly selects one SA resource element from among the 16 SA resource elements in the second SA resource illustrated in FIG. 6. The V2V scheduler 32 also selects a resource for transmitting that non-priority data from the data resource pool 31c. In other words, the V2V scheduler 32 randomly selects one data resource element from among data resource elements in the data resources illustrated in FIG. 6.

Then the communication device 2 transmits the control information of the non-priority data by using the selected SA resource element, and transmits the non-priority data by using the selected data resource element. For this transmission, the communication device 2 transmits the control information in the first V2V period after the non-priority data is generated, and transmits the generated non-priority data in the next V2V period. Specifically, the control information is transmitted in V2V period P3 and the non-priority data is transmitted in V2V period P4.

The control information of non-priority data includes SA information that indicates a resource used for transmitting that non-priority data. The SA information specifies the subcarrier frequency and the time slot used for transmitting the non-priority data. In other words, the SA information specifies a resource element selected from the data resource pool 31c for transmitting the non-priority data.

However, when a communication device 2 transmits non-priority data, the V2V scheduler 32 determines a data resource for transmitting the non-priority data in such a manner that the determined data resource will not overlap with a resource that is occupied by priority data transmitted by another communication device. Note that a resource occupied by priority data transmitted by another communication device is detected by the V2V control signal detector 37 and the priority data detector 38 as described above. Specifically, the V2V control signal detector 37 detects the control information (SA information in this example) that is transmitted from another communication device. The SA information specifies a subcarrier frequency and a time slot used for transmitting the data. Therefore, the priority data detector 38 can detect, based on the received SA information, a resource that is occupied by priority data transmitted by another communication device.

As described above, different resources are used for transmitting the control information of priority data and for transmitting the control information of non-priority data in the first embodiment. This prevents a conflict between a resource for transmitting the control information of priority data and a resource for transmitting the control information of non-priority data. Also, a resource for transmitting non-priority data is determined in such a manner that it will not overlap with a resource for transmitting priority data. The allocation of data resources is performed by each communication device. Thus, when another communication device transmits priority data, a communication device 2 transmits non-priority data by using a resource that is different from the resource for that priority data. Similarly, when a communication device 2 transmits priority data, other communication devices transmit non-priority data by using resources that are different from the resource for that priority data. Therefore, the transmission of priority data is not interrupted by non-priority data.

Note that when a communication device 2 and another communication device transmit priority data by using the same resource, the pieces of the priority data may collide with each other. However, a possibility for a plurality of communication devices to use the same resource to transmit priority data is considered to be low.

In addition, the length of a period of a V2V communication is 10 m seconds in the example illustrated in FIG. 5. Accordingly, data transmission is completed within 20 m seconds in a case when control information is transmitted in the first V2V period after the V2V data is generated and the data is transmitted in the next V2V period. In other words, the latency of a V2V communication can be lowered sufficiently.

FIG. 7 is a flowchart illustrating an example of a data transmission method according to the first embodiment. It is assumed that resource information is reported from a base station and is stored in the resource information memory 31.

In S1, the V2V data generator 34 generates V2V data. The data type (priority/non-priority) of the generated V2V data is reported from the V2V data generator 34 to the V2V scheduler 32.

In S2, the V2V scheduler 32 determines whether the generated V2V data is priority data or non-priority data. When priority data is generated, the V2V scheduler 32 executes the processes in S3 and S4. Specifically, the V2V scheduler 32 selects an SA resource from the first SA resource pool 31a in S3. The V2V scheduler 32 also selects a data resource from the data resource pool 31c in S4.

When non-priority data is generated, the processes in S5 through S7 are executed. Specifically, the V2V scheduler 32 selects an SA resource from the second SA resource pool 31b in S5. In S6, the priority data detector 38 detects a data resource that is used for priority data transmitted by another communication device. In S7, the V2V scheduler 32 selects a data resource from the data resource pool 31c in such a manner that the selected data resource will not overlap with a data resource that is used for priority data transmitted by another communication device. Note that when priority data is not transmitted by another communication device, the V2V scheduler 32 can select an arbitrary data resource from the data resource pool 31c.

In S8, a communication device 2 transmits the control information of V2V data by using the selected SA resource. The communication device 2 also transmits the V2V data by using the selected data resource.

Figure 8A:
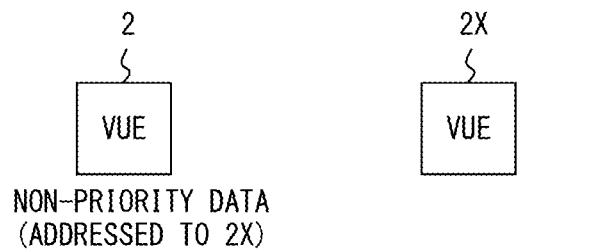
FIG. 8A illustrates an example of an operation of the communication device according to the first embodiment.
Figure 8B:
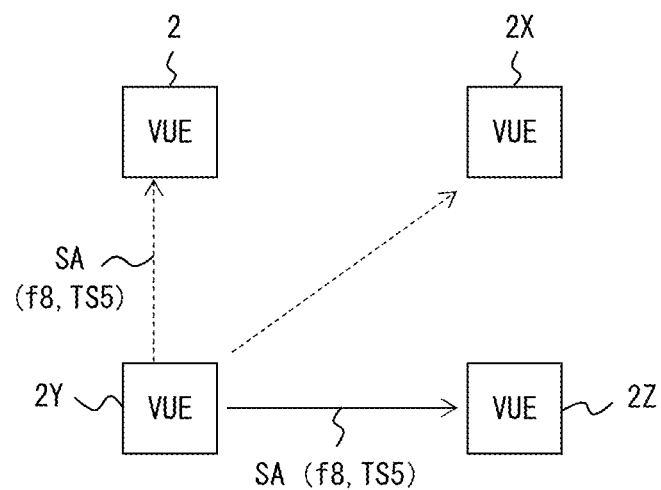
FIG. 8B illustrates an example of an operation of the communication device according to the first embodiment.
Figure 8C:
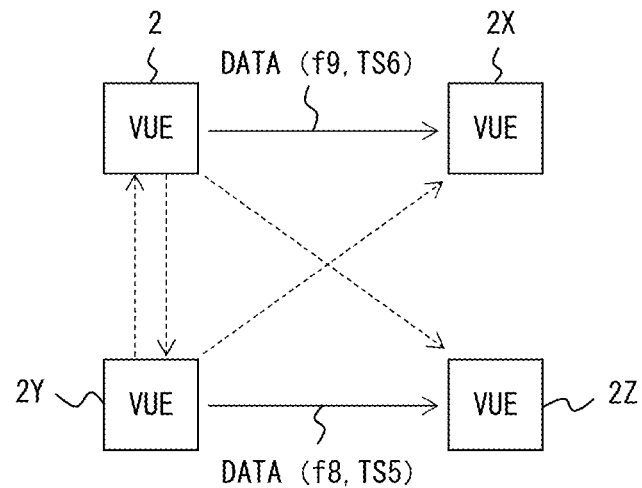
FIG. 8C illustrates an example of an operation of the communication device according to the first embodiment.

FIGS. 8A-8C illustrate an example of an operation of a communication device according to the first embodiment. It is assumed in this example that the communication device 2 transmits non-priority data to the communication device 2X and that the communication device 2Y transmits priority data to the communication device 2Z as illustrated in FIG. 8A.

Because the communication device 2Y transmits priority data, the communication device 2Y selects a resource without taking into consideration a V2V signal that is transmitted from other communication devices. It is assumed in this example that the communication device 2Y selects the data resource of "subcarrier frequency of f8 and time slot of TS5" for transmitting priority data to the communication device 2Z. In such a case, the communication device 2Y transmits, to the communication device 2Z, the control information including the SA information that indicates the selected data resource as illustrated in FIG. 8B. It is assumed that this control information reaches the communication device 2 as well.

Because the communication device 2 transmits non-priority data, the communication device 2 selects a resource while taking into consideration a V2V signal that is transmitted from another communication device. Specifically, the communication device 2 selects a resource while taking into consideration control information that is received from the communication device 2Y. In this situation, the control information that is received from the communication device 2Y specifies the data resource of "subcarrier frequency of f8 and time slot of TS5". Accordingly, the communication device 2 selects a data resource other than the data resource of "subcarrier frequency of f8 and time slot of TS5" from the data resource pool. It is assumed in this example that the communication device 2 selects the data resource of "subcarrier frequency of f9 and time slot of TS6".

As a result of this, the communication device 2Y transmits priority data to the communication device 2Z in "subcarrier frequency of f8 and time slot of TS5". The communication device 2 transmits non-priority data to the communication device 2X in "subcarrier frequency of f9 and time slot of TS6". Thereby, collisions of V2V data are avoided.

Note in the above example that when the communication device 2 transmits non-priority data, the V2V scheduler 32 determines a data resource that is to be used by the communication device 2 in such a manner that the determined data resource will not overlap with a resource occupied by priority data that is transmitted by another communication device. However, the first embodiment is not limited to this method. Specifically, when the communication device 2 transmits non-priority data, the V2V scheduler 32 may determine a data resource used by the communication device 2 in such a manner that the determined data resource will not overlap with a resource occupied by V2V data (priority data or non-priority data) that is transmitted by another communication device. Alternatively, when the communication device 2 transmits V2V data (priority data or non-priority data), the V2V scheduler 32 may determine a data resource used by the communication device 2 in such a manner that the determined data resource will not overlap with a resource occupied by V2V data (priority data or non-priority data) that is transmitted by another communication device.

Also, when the priority data detector 38 detects that another communication device is to transmit priority data while the communication device 2 is ready to transmit non-priority data (i.e. when non-priority data has been generated in the communication device 2), the V2V scheduler 32 of the communication device 2 may stop the transmission of the non-priority data.

Also, in the above example, resources for control information of priority data and resources for control information of non-priority data are arranged at identical time intervals. In the example illustrated in FIG. 5, resources SA1 for the control information of priority data and resources SA2 for the control information of non-priority data are both arranged at intervals of 10 m seconds. However, the first embodiment is not limited to this method.

Figure 9:
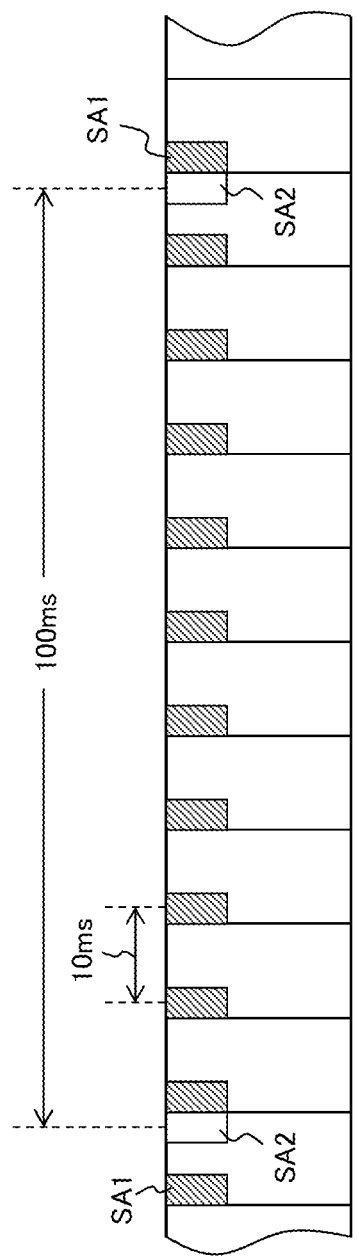
FIG. 9 illustrates another example of resource allocation to a V2V communication.

For example, when the allowable latency of non-priority data is larger than that of priority data, resources for the control information of non-priority data may be arranged at longer time intervals as illustrated in FIG. 9. In the example illustrated in FIG. 9, the time interval is 10 m seconds for the arrangement of resource SA1 for the control information of priority data and the time interval is 100 m seconds for the arrangement of resource SA2 for the control information of non-priority data.

Further, the arrangement of a resource pool for V2V communications may be designed in a fixed manner by a base station or may be updated in accordance with communication environments. When the arrangement of a resource pool is to be updated in accordance with communication environments, the base station updates the arrangement of the resource pool for V2V communications based on radio wave condition information reported from each communication device.

Figure 10:
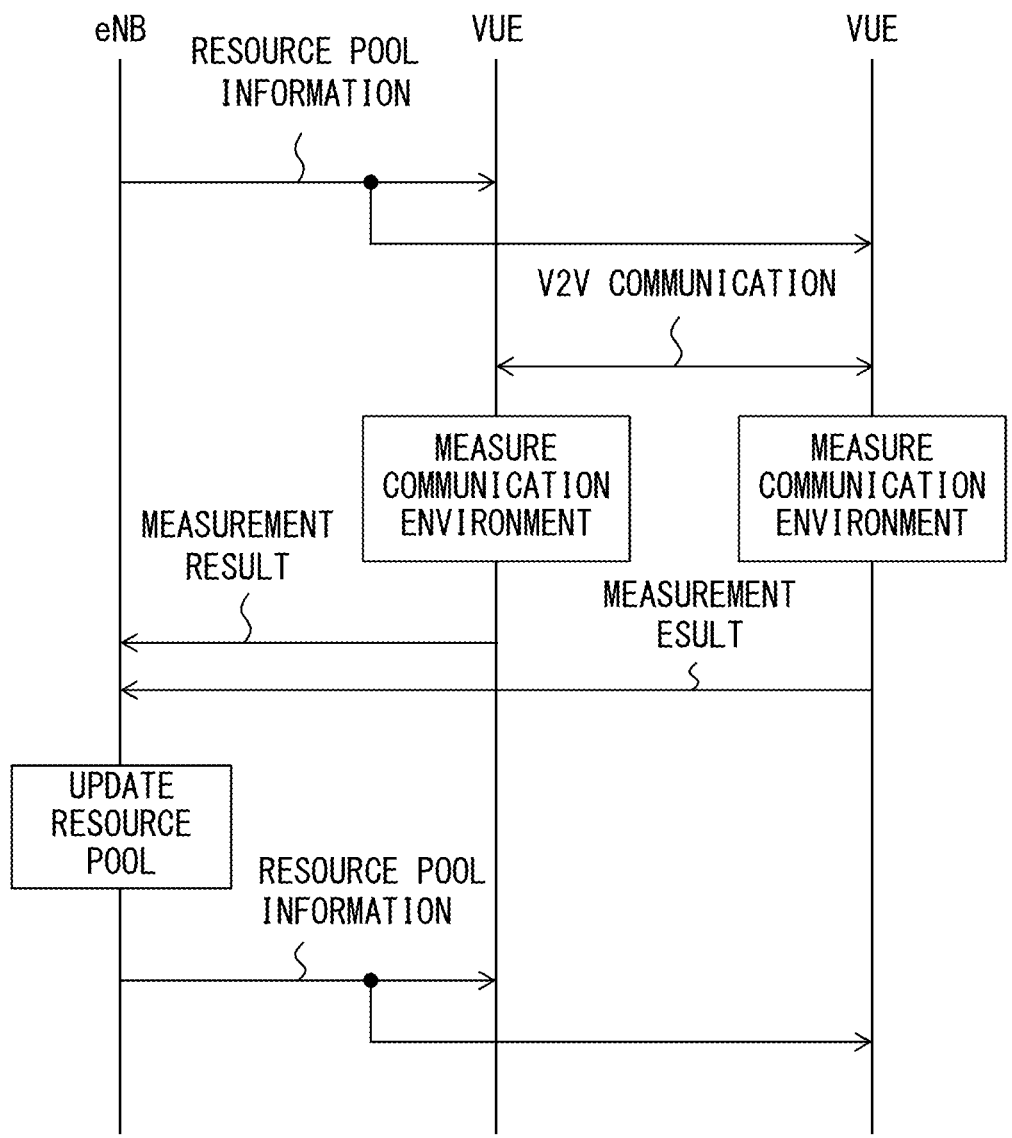
FIG. 10 illustrates an example of a procedure of updating a resource arrangement for a V2V communication.

FIG. 10 illustrates an example of a procedure of updating a resource pool arrangement for a V2V communication. In this example, the base station (eNB) determines a resource pool arrangement for a V2V communication in advance. Thereafter, resource pool information that represents this resource pool arrangement is distributed from the base station to each communication device (VUE). Each communication device autonomously selects a V2V resource based on the resource pool information received from the base station, and may perform a V2V communication. Each communication device measures the radio wave condition of the V2V signal. For example, each communication device measures the power and interference power etc. at a frequency that carries the V2V signal. Then each communication device reports the measurement result to the base station. The base station updates the resource pool arrangement for a V2V communication based on the radio wave condition information reported from the communication device. Thereafter, the base station distributes resource pool information that represents the updated resource pool arrangement to each communication device.

In the above procedure, the base station determines a resource pool arrangement in such a manner for example that the control information for priority data will be transmitted by using a frequency in a good radio wave condition. In such a case, the control information for transmitting priority data reaches the destination device surely, leading to improved reliability of V2V communications. Note that while a configuration example of resource pool information has been described, a scenario according to this embodiment can also be applied to a case where a base station (eNB) precisely determines a resource used for directly transmitting data between V2V terminals.

Second Embodiment

In the first embodiment, the control information of V2V data is transmitted, and thereafter the V2V data corresponding to that control information is transmitted. Accordingly, a communication device that receives the V2V signal recognizes a resource for transmitting the V2V data based on the control information, and thereafter extracts the V2V data from the recognized resource.

By contrast, V2V data and the control information of that V2V data are transmitted in the same subframe in a second embodiment.

A plurality of subcarriers of different frequencies are allocated to a subframe. In D2D communication, 12 subcarriers are allocated to a subframe. Each subcarrier in a subframe transmits 14 symbols. In other words, a subframe can transmit 168 symbols.

Figure 11:
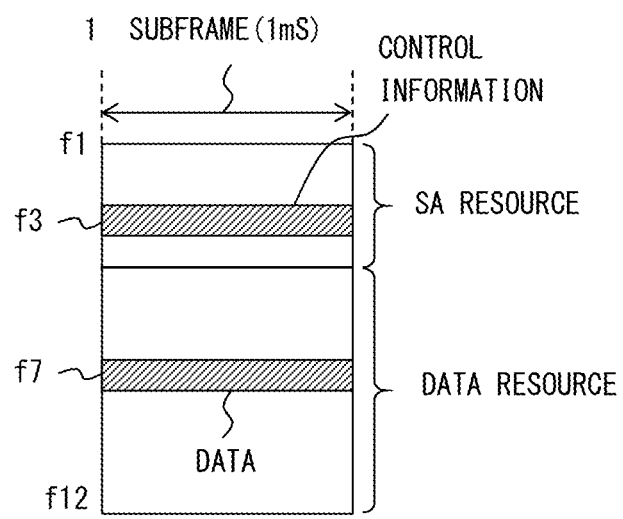
FIG. 11 illustrates an example of resource allocation according to a second embodiment.

Resources allocated to each subframe may be divided into an SA resource and a data resource as illustrated in FIG. 11. In this example, subcarrier frequencies f1 through f4 are allocated to the SA resource and subcarrier frequencies f5 through f12 are allocated to the data resource. Also, the control information and the data are multiplexed into a subframe by FDM (Frequency Division Multiplexing).

In the example illustrated in FIG. 11, the control information is transmitted by using subcarrier frequency f3. The SA information included in the control information specifies a data resource for transmitting the V2V data. In this example, the SA information specifies f7 as a subcarrier frequency for transmitting the V2V data.

A communication device that receives the V2V signal demodulates for example all the subcarrier frequencies that are allocated to the V2V communication. Thereby, the communication device obtains the SA information from frequency f3. In this example, the SA information indicates that V2V data is transmitted by using frequency f7. Accordingly, from among eight data strings obtained by demodulating frequencies f5 through f12, the communication device extracts data that is recovered from frequency f7. Thereby, the communication device that receives the V2V signal can obtain target data. Also, the communication device that transmits the V2V signal can transmit the V2V data by using a desired subframe. This further lowers latency of V2V communications.

Note that a communication parameter may be determined based on the data type (priority/non-priority) of V2V data that a communication device 2 transmits. For example, when priority data is to be transmitted, a communication device 2 may select an MCS that leads to the lowest error rate and transmit control information and data with the maximum transmission power. In such a case, the communication device 2 may autonomously determine a resource to be used from a given resource pool. When, by contrast, non-priority data is to be transmitted, a communication device 2 may estimate the channel quality of a V2V communication and determine, based on the estimation result, an MCS, transmission power and a resource to be used. For example, channel quality is estimated by using a discovery signal that is transmitted between communication devices. In such a case, the communication device 2 may determine an MCS, transmission power and a resource based on channel quality information that is fed back from other communication devices.

Third Embodiment

In the first embodiment, different resources are used for transmitting the control information of priority data and for transmitting the control information of non-priority data. In a third embodiment, by contrast, a common resource pool is prepared for priority data and non-priority data.

Figure 12:
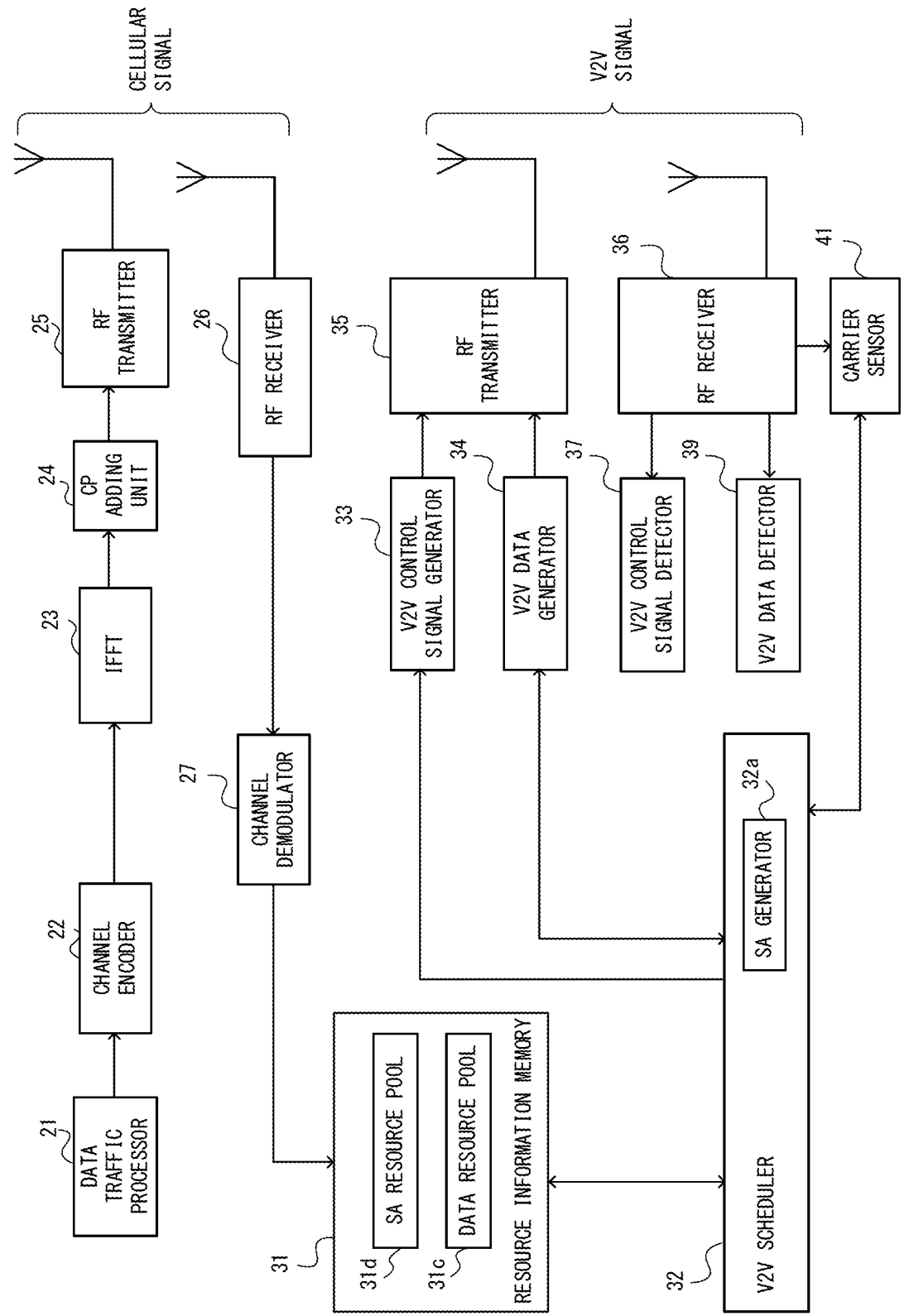
FIG. 12 illustrates an example of a communication device according to a third embodiment.

FIG. 12 illustrates an example of a communication device related to the third embodiment of the present invention. Note that circuits for supporting a cellular communication are substantially identical to each other in the first and third embodiments. Also, circuits for supporting a V2V communication are similar to each other in the first and third embodiments. However, the communication device 2 in the third embodiment includes a carrier sensor 41 as illustrated in FIG. 12. Also, an SA resource pool 31d and the data resource pool 31c are stored in the resource information memory 31. The SA resource pool 31d is used both for transmitting the control information of priority data and for transmitting the control information of non-priority data.

The carrier sensor 41 can detect the radio wave intensities of all the resources (SA resources and data resources) allocated to a V2V communication. In other words, the carrier sensor 41 can detect the received radio wave intensity of each of the subframes for each subcarrier. In this configuration, when the received radio wave intensity of a resource element is higher than a prescribed threshold level, it is determined that another communication device is using that resource element for transmitting control information or V2V data. The V2V scheduler 32 performs scheduling for a V2V communication while taking a detection result obtained from the carrier sensor 41 into consideration as needed.

FIG. 13 is a flowchart illustrating an example of a data transmission method according to the third embodiment. Note that S1 and S2 in the third embodiment are substantially identical to those in the first embodiment. In other words, when V2V data to be transmitted by a communication device 2 is generated, the data type (priority/non-priority) of that V2V data is determined.

When priority data is generated, the V2V scheduler 32 performs the processes in S11 and S12. Specifically, the V2V scheduler 32 selects an SA resource from the SA resource pool 31d in S11. Also, the V2V scheduler 32 selects a data resource from the data resource pool 31c in S12. In doing so, the V2V scheduler 32 does not have to take a detection result obtained from the carrier sensor 41 into consideration.

When non-priority data is generated, the processes in S13 through S15 are performed. Specifically, in S13, the carrier sensor 41 detects the received radio wave intensities of all the resources that are allocated to a V2V communication. In this detection, a resource with a received radio wave intensity higher than a threshold level is determined to be a resource that is being used by another communication device. Then, the carrier sensor 41 reports to the V2V scheduler 32 the resource that is being used by another communication device.

In S14, the V2V scheduler 32 selects, from the SA resource pool 31d, an SA resource that is not being used by another communication device. Also, in S15, the V2V scheduler 32 selects, from the data resource pool 31c, a data resource that is not being used by another communication device. Note that when another communication device is not using a resource, the V2V scheduler 32 selects an arbitrary SA resource from the SA resource pool 31d and selects an arbitrary data resource from the data resource pool 31c. In S16, the communication device 2 transmits the control information of a V2V data by using the SA resource selected in S11 or S14. Also, the communication device 2 transmits the V2V data by using the data resource selected in S12 or S15.

As described above, when the communication device 2 transmits priority data, the priority data is transmitted instantaneously without performing carrier sensing in the third embodiment. When, by contrast, the communication device 2 transmits non-priority data, carrier sensing is performed in order to monitor whether or not there is a resource that is being used by another communication device. Then, the communication device 2 transmits the non-priority data by using a resource that is not being used by another communication device. Thus, the transmission of non-priority data does not interrupt other V2V data in the third embodiment.

Note that while FIG. 13 illustrates an example in which carrier sensing is not performed when the communication device 2 transmits priority data, the third embodiment is not limited to this method. Specifically, a resource may be selected based on a result of carrier sensing even when the communication device 2 transmits priority data. However, it is desirable that the communication device 2 perform different operations depending upon whether the communication device 2 transmits priority data or non-priority data.

For example, when the communication device 2 transmits non-priority data, the carrier sensor 41 starts carrier sensing when a prescribed backoff time has elapsed since that non-priority data was generated. When, by contrast, the communication device 2 transmits priority data, the carrier sensor 41 starts carrier sensing without a backoff time or when a short backoff time has elapsed.

Alternatively, when the communication device 2 transmits non-priority data, the carrier sensor 41 performs carrier sensing on all the resources allocated to a V2V communication. When, by contrast, the communication device 2 transmits priority data, the carrier sensor 41 may perform carrier sensing on a specified portion of resources allocated to a V2V communication. In such a case, the V2V scheduler 32 selects a resource for transmitting priority data from the resource on which the carrier sensing was performed.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present inventions have been described in detail, it should be understood that the various changes, substitutions, and alterations could be made hereto without departing from the spirit and scope of the invention.

What is claimed is:

1. A communication device that supports a D2D (Device-to-Device) communication, the communication device comprising:
   a storage configured to store a first resource pool information that indicates first resource pool including control resources allocated to control information for transmitting data and a second resource pool information that indicates second resource pool including data resources allocated to data, the data is a first type or a second type;
   a scheduler configured to select a first resource for transmitting control information from the first resource pool and select a second resource for transmitting data from the second resource pool;
   a transmitter configured to transmit the control information by using the first resource and transmit the data by using the second resource, and
   a processor circuit configured to control to perform a carrier sense in a first range when the transmitter transmits data of the first type, and to control to perform a carrier sense in a second range when the transmitter transmits data of the second type, the first range being larger than the second range and the second range being a portion of the first range, wherein
   the scheduler selects the second resource from the second resource pool according to a received signal intensity in at least one of resources included in the first resource pool and the second resource pool.

2. The communication device according to claim 1, further comprising
   a detector configured to detect a resource that is used by another communication device, wherein
   the scheduler selects the second resource from resources other than a resource that is used by another communication device when the detector detects a resource that is used by another communication device.

3. The communication device according to claim 2, wherein,
   the detector decodes a control signal of the other communication device, and detects the resource based on the decoded control signal.

4. The communication device according to claim 1, further comprising
   a measurement unit configured to measure a received signal intensity.

5. The communication device according to claim 4, wherein
   the measurement unit determines a target resource in which a received signal intensity is measured according to a level of priority of the data.

6. The communication device according to claim 1, wherein
   the transmitter determines a transmission power of the data according to a level of priority of the data.

7. The communication device according to claim 1, wherein
   the scheduler selects the second resource from resources in which a received signal intensity is lower than a specified threshold.

8. The communication device according to claim 1, wherein
   the scheduler selects, as the second resource, a resource in which a possibility that another communication device uses the resource is low from the second resource pool according to a received signal intensity.

9. The communication device according to claim 1, further comprising
   a receiver configured to receive information relating to the first resource pool and the second resource pool.

10. The communication device according to claim 1, wherein
    the scheduler selects the first resource from the first resource pool including a plurality of first resource elements that are respectively able to transmit the control information.

11. The communication device according to claim 1, wherein
    the scheduler selects the second resource from the second resource pool including a plurality of second resource elements that are respectively able to transmit the data.

12. The communication device according to claim 1, wherein
    the transmitter transmits the control information and the data by using an identical subframe.

13. The communication device according to claim 1, wherein
    the scheduler selects the second resource from the second resource pool including a plurality of second resource elements that are respectively able to transmit the data, and
    the transmitter determines a transmission power of the data according to a level of priority of the data.

14. A communication method in a communication device that supports a D2D (Device-to-Device) communication, the communication method comprising:
    storing a first resource pool information that indicates first resource pool including control resources allocated to control information for transmitting data and a second resource pool information that indicates second resource pool including data resources allocated to data in a memory, the data is a first type or a second type;
    selecting a first resource for transmitting control information from the first resource pool and selecting a second resource for transmitting data from the second resource pool according to a received signal intensity in at least one of resources included in the first resource pool and the second resource pool;
    performing a carrier sense in a first range when the communication device transmits data of the first type;
    performing a carrier sense in a second range when the communication device transmits data of the second type, the first range being larger than the second range and the second range being a portion of the first range; and
    transmitting the control information by using the first resource and transmitting the data by using the second resource after the carrier sense.

15. A wireless communication system that includes a first communication device and a second communication device that respectively support a D2D (Device-to-Device) communication, wherein
    the first communication device includes:
        a storage configured to store a first resource pool information that indicates first resource pool including control resources allocated to control information for transmitting data and a second resource pool information that indicates second resource pool including data resources allocated to data, the data is a first type or a second type;
        a scheduler configured to select a first resource for transmitting control information from the first resource pool and select a second resource for transmitting data from the second resource pool according to a received signal intensity in at least one of resources included in the first resource pool and the second resource pool;
a transmitter configured to transmit the control information by using the first resource and transmit the data by using the second resource; and
a processor circuit configured to control to perform a carrier sense in a first range when the transmitter transmits data of the first type, and to control to perform a carrier sense in a second range when the transmitter transmits data of the second type, the first range being larger than the second range and the second range being a portion of the first range, and wherein the second communication device includes
a receiver that receives the control information transmitted by using the first resource and the data transmitted by using the second resource.

\* \* \* \* \*